United States Patent [19]

Woodhams

[11] 4,426,458

[45] Jan. 17, 1984

[54] FIBER REINFORCED SULPHUR CONCRETES

[75] Inventor: Raymond T. Woodhams, Toronto, Canada

[73] Assignee: Sulphur Development Institute of Canada (SUDIC), Calgary, Canada

[21] Appl. No.: 403,802

[22] Filed: Jul. 30, 1982

[51] Int. Cl.³ .............................................. C04B 19/06
[52] U.S. Cl. .................................. 501/140; 106/287.32
[58] Field of Search .................... 106/287.32; 501/140

[56] References Cited

U.S. PATENT DOCUMENTS

| | | | |
|---|---|---|---|
| 1,438,840 | 12/1922 | Loch et al. | 501/140 |
| 1,557,231 | 10/1925 | Adamski | 501/140 |
| 3,316,115 | 4/1967 | Barnes et al. | 106/287.32 |
| 3,823,019 | 7/1974 | Dale et al. | 106/287.32 |
| 3,997,355 | 12/1976 | Santucci | 106/287.32 |

*Primary Examiner*—James Poer
*Attorney, Agent, or Firm*—Bachman and LaPointe

[57] ABSTRACT

The inclusion of fibre elements in a sulphur/mineral aggregate composition, for example, a sulphur concrete or mortar, improves the fracture toughness of the composition and retards crack propagation.

15 Claims, 5 Drawing Figures

FIBER REINFORCED SULPHUR CONCRETES

BACKGROUND OF THE INVENTION (a) Field of the Invention

This invention relates to moldable compositions and molded articles based on a sulphur component and a mineral aggregate and their preparation; more especially the invention is concerned with sulphur concretes, sulphur mortars and other sulphur-bound compositions of improved fracture toughness and in which crack propagation is retarded.

(b) Description of the Prior Art

Mixtures of mineral aggregate and sulphur, wherein the sulphur functions as a binder are termed sulphur concretes or sulphur mortars depending on the form of the mineral aggregate.

Articles which may be formed by casting such sulphur concretes include preformed concrete articles conventionally formed from concretes based on a mixture of a hydraulic cement, such as Portland cement, mineral aggregate and water together with various additives. Such articles include paving slabs, structural members, curbing, gutters, pipes and other cast products.

Sulphur mortars may be employed, for example, in the cementing or joining of pipe, bricks and tile, and as coating compositions to provide a protective surface.

Sulphur concretes and mortars display certain advantages, as compared with Portland cement, although they also suffer from certain disadvantages.

Sulphur is available in large quantities both as a by-product of oil refining and natural gas processing in the petroleum industry and from mining of sulphur deposits.

Although sulphur/mineral aggregate compositions, for example, sulphur concretes have many desirable properties, their use in some areas is hindered or limited by their low tensile strengths, brittle nature and poor fracture toughness, as a result of which the sulphur concretes tend to fracture abruptly when sharply impacted.

In brittle materials such as conventional sulphur concretes, cracks initiate as small tensile strains and the first crack usually leads to crack propagation and to complete failure of the material.

There is thus a need to improve the fracture toughness of conventional sulphur/mineral aggregate compositions, for example, sulphur concretes and to retard crack propagation in such compositions.

It has previously been proposed to include fibrous, flake or finely divided particulate material in sulphur based compositions. See, for example, U.S. Pat. Nos. 429,999; 1,438,840; 1,547,666; 1,557,231; 1,675,376; 3,306,000; 3,992,340; 3,997,355; 4,225,353 and 4,302,255.

Such fibrous, flake or finely divided particulate material has in particular been added in relatively small amounts as fillers or reinforcing agents. In the case of fibrous materials the afore-mentioned U.S. Patents require that the fibres be of short length, in particular not more than 1 inch and usually much shorter than 1 inch. U.S. Pat. No. 3,547,666, for example, employs asbestos fibres having an average length of about one-eighth of an inch or less; and U.S. Pat. No. 3,306,000 specifies that the fibres should not substantially exceed 0.50 inch in length because longer fibres tend to ball up in molten sulphur and do not give uniform compositions.

None of the prior U.S. Patents acknowledged above attribute improved fracture toughness or retardation of crack propagation to the fibrous, flake or finely divided particulate materials that they employ. In addition the prior U.S. Patents appear to consider that these distinct physical forms are equivalent.

It is an object of this invention to provide sulphur/mineral aggregate compositions, for example, sulphur concretes and mortars of improved fracture toughness and in which crack propagation is retarded.

It is a further object of this invention to provide a process for the manufacture of such sulphur/mineral aggregate compositions.

SUMMARY OF THE INVENTION

It has been found that the incorporation into a composition comprising a mixture of a sulphur component and particulate mineral aggregate of fiber elements improves the fracture toughness of the composition and retards crack propagation.

In particular the fibre elements have a length of at least 3 cm, and suitably of 3 to 6 cm, and are thus significantly longer than the fibres of the fibrous material previously suggested as a filler or reinforcing agent.

The invention contemplates hot-moldable compositions and molded articles comprising a mixture of the particulate mineral aggregate and the sulphur component, the sulphur component being present in an amount effective to bind the aggregate, with the fibre elements dispersed throughout the mixture.

The terms "hot-moldable" and "molded" in this specification embrace compositions which can be precast into molds or forms, or poured, extruded, trowelled, sprayed, slip formed or paved in place for in situ installation when the sulphur component is in a fluid state, as is the case with Portland cement concretes.

Other conventional additives or modifiers used in sulphur/mineral aggregate compositions can be used in the compositions of the invention. It may, in particular, be desirable to incorporate plasticizers and fire retardants in the compositions to impart special properties for specific applications and end uses.

For example, where plasticization is required such additives as olefinic hydrocarbon polymers (U.S. Pat. No. 4,058,500—Vroom; the disclosure of which is hereby incorporated by reference) and dicyclopentadiene can be used. Also for example where compositions of improved flame resistance are required, fire retardants such as halogenated 1,5,9cyclododecatrienes may be added.

The additives described in U.S. Pat. No. 4,188,230, the disclosure of which is herein incorporated by reference, may also be employed.

DESCRIPTION OF THE PREFERRED EMBODIMENTS (i) Sulphur Compositions

The sulphur/mineral aggregate compositions are, in particular hot moldable sulphur concretes and mortars and molded sulphur concrete articles in which particles of the mineral aggregate are held or bonded together in a matrix of the sulphur component, the fibre elements being dispersed througout the matrix.

(a) Fibre Elements

The fibre elements are, in particular, flexible members having a significant length to cross-sectional area ratio. They may be considered as generally cylindrical selfsupporting members which will flex or bend on application of a force.

Suitably the fibre elements are dispersed substantially uniformly throughout the sulphur matrix.

The fibre elements may be organic or inorganic in nature or may include both organic or inorganic components, however, they should not be of a material which will melt or soften or be otherwise adversely affected by molten sulphur or the temperatures at which molten sulphur is handled.

In particular the fibre elements may comprise a bundle of fine organic or inorganic filaments, the bundle being coated with a binder to minimize filament separation. The bundle may conveniently take the form of a roving or strand of the fine filaments cut to an appropriate length.

Suitable organic fibre elements include polymer fibre elements, for example, of polyester, polypropylene, cellulosic fibre elements, for example, of wood, hemp, jute, bagasse, sugar cane and forest products. Waste tire cord and large diameter monofilaments as used in fishing twine and sports racquets may also be employed as a source of fibre elements.

Suitable inorganic fibre elements include glass fibre elements of, for example, alkali resistant glass and E-glass or metal fibres.

The fibre elements suitably have a length of 3 to 6 cm., preferably 3 to 5 cm., with 3 to 4 cm. being especially preferred for many applications. For ease of mixing and dispersion lengths of 4 to 5 cm. are preferred.

It is found that the length of the fibre elements have a major influence on the fracture toughness and that it is preferably to employ fibre elements having a length close to the critical length.

The critical length is expressed by the relationship $$L_c = (d\delta_{fu}/2\tau)$$

in which:

$L_c$ is the critical length
d is the diameter of the fibre element
$\delta_{fu}$ is the ultimate tensile strength of the fibre element
$\tau$ is the average interfacial shear stress.

In a sulphur concrete, the ultimate sulphur matrix strain is les than the ultimate fibre strain so that matrix cracking occurs first, followed by progressive debonding and pullout of the randomly dispersed fibre elements. If the dispersed fibre elements are very long they will tend to breaK near the fracture plane rather than be extracted by pullout. On the other hand, short fibre elements will tend to pull out of the sulphur matrix before they reach their breaking strain. The critical length $L_c$ is an intermediate length at which the fibre elements are on the verge of breaking or pulling out as the pullout force approaches the breaking stress of the fibre element.

By reference to the afore-mentioned relationship it will be seen that the critical length $L_c$ can be increased or decreased by changing the effective diameter d of the element or by modifying the shear stress $\tau$ at the interface; the latter may be achieved by increasing or decreasing the adhesion between the fibre elements and the sulphur matrix.

Simple pullout experiments may be employed to directly measure $L_c$ for a particular system.

Fibre elements with widely differing mechanical properties may be employed, for example, fibre elements having a modulus in the range of about 5 to about 75 GPa, an ultimate (breaking) elongation of 3% to 20% and a tensile strength of 750 to 3000 MPa.

Suitably the fibre elements, in generally, cylindrical form, may have a diameter of about 100 to 1000 preferably 150 to 350 $\mu$m.

The fibre elements are suitably employed in an amount of 1% to 10%, preferably 3% to 9% and more preferably 5% to 7%, by weight, based on the weight of the sulphur component. On a volume basis the fibre elements are suitably employed in an amount of 1% to 20%, preferably about 2% to 5%, by volume of the sulphur component.

The binder coating employed for the case in which the fibre elements comprise bundles of fine filaments, functions to maintain bundle integrity, particularly during mixing in the manufacture of the composition, and to prevent individual filaments from separating out and entanglement or balling of the filaments.

The binder coating may also function to promote adhesion with the sulphur matrix. In this case its use is not necessarily limited to fibre elements based on bundles of fine filaments.

The binder coating may also be appropriately selected not merely for the general promotion of adhesion between the sulphur matrix but also to ensure that good adhesion is maintained when the composition or articles molded therefrom are exposed to aqueous or corrosive environments.

The binder coating is appropriately selected bearing in mind the intended use and desired properties.

Thermosetting resin binders have been found to be particularly useful for maintaining the integrity of a bundle of filaments and for promoting adhesion with the sulphur matrix.

Suitably thermosetting resins include acrylic resins, phenolic resins, epoxy resins, polyurethane resins and polyester resins.

Thermoplastic binders may be used if the softening point of the resin is above the processing temperature, for example, nylon, polyethylene terephthalate, polycarbonate or polphenylene oxide. In practise it is generally easier to apply liquid thermosetting resins or latices. The binder, or course, should not be soluble in or attacked by the molten sulfur mixture.

(b) Fracture Toughness and Crack Propagation Retardation

The fibre elements serve as a crack arrestor which inhibits and delays the propagation of cracks through the sulphur matrix. While not wishing to be bound by any theory it is thought that in order to have a tough sulphur/mineral aggregate composition it is desirable that the fibre elements have a breaking strain greater than that of the sulphur matrix, and be sufficiently strong to withstand the load placed on them after failure of the sulphur matrix. When both conditions are satisfied and if there are sufficient fibre elements, the cracked member will retain some strength since the cracks will be bridged by the fibre elements. If the volume fraction of the fibre elements is greater than a critical volume fraction, the sulphur matrix will exhibit multiple fracture characterized by a number of cracks appearing perpendicular to the applied stress.

For a given fibre element the toughness of the composition is directly proportional to the critical length and the fibre concentration. The maximum toughness may, to an approximation, be expressed by the following relationship:

$$G \simeq \frac{L_c \, \delta_{fu} \, V_f}{10}$$

in which:
G is the total fracture energy
$L_c$ is the critical length of the fibre elements
$\delta_{fu}$ is the ultimate tensile strength of the fibre elements
$V_f$ is the fibre volume fraction.

The fracture energy G is only that portion of the total fracture energy that is due to fibre pullout (about 60 to 85% in most examples). Furthermore, the relationship above is only valid for fibres having the critical length ($L=L_c$) wherein the fibres are all parallel. For a non aligned fibre composite it is preferable to write:

$$G_{max}^{pullout} = K \, L_c \, \delta_{fu} \, V_f \,(\text{where } L = L_c)$$

where
k=constant related to fibre orientation
$L_c$=critical length of fibre element at a given diameter
$\delta_{fu}$=the ultimate tensile strength of the fibre elements
$V_f$=the fibre volume fraction
L=Length of fibre.

In accordance with the invention an approximately 20-fold increase in fracture toughness may be obtained with fibre elements having a length of about 5 cm., with a volume fraction of about 1%.

(ii) Sulphur Component

The sulphur component may be elemental sulphur or modified elemental sulphur. Modified elemental sulphur is sulphur which is chemically or physically modified, for example, modified sulphur may be sulphur which has been plasticized; plasticizers for sulphur are known and include dicyclopentadiene, styrene, vinyl toluene, coal tar, terpene polysulphides and olefinic hydrocarbon polymers (U.S. Pat. No. 4,058,500—Vroom, the disclosure of which is herein incorporated by reference), and mixtures thereof.

Modified elemental sulphur produces sulphur concretes within the invention which demonstrate ductility characteristics superior to those of the sulphur concretes of the invention, which contain unmodified elemental sulphur.

The modified sulphur suitably contains about 1 to 30%, particularly 1 to 10%, by weight of the plasticizer, based on the weight of elemental sulphur.

The sulphur component acts as the bonding agent in the composition. It bonds the mineral aggregate particles in a matrix of the sulphur component.

The sulphur component also serves as the medium to hold the fibre elements.

The sulphur component is suitably employed in an amount of from 5 to 60% by weight of the composition, in the case of concretes and mortars, the amount depending on the properties required in the composition and the aggregate employed.

(iii) Aggregates

The mineral aggregates in the compositions of the invention may include coarse aggregate, fine aggregate and fines.

Coarse aggregate includes gravel, crushed stone, slag and other material of mineral composition having a particle size of at least 4.75 mm. and particularly 1.5 cm. to 4 cm.

Coarse aggregate is sometimes frost susceptible, probably because of the pore structure in the aggregate and therefore use of such aggregate is less preferred, or in any event it is preferable that such aggregate be used in lesser amounts.

Fine aggregate includes sand and other material of mineral composition having a particle size of about 150 μm. to about 4.75 mm.

Fines include fly ash, pyrrhotite, crushed shale, illite and other material of mineral composition having a particle size less than about 150 μm.

Generally speaking sulphur mortars contain no coarse aggregate, whereas sulphur concretes contain a major amount of coarse aggregate. A sulphur concrete should suitably contain as much coarse material as possible as to occupy the major volume of the concrete, thereby reducing the amount of the more expensive sulphur which is needed.

(iv) Sulphur Concretes and Mortars

The sulphur compositions of the invention need not contain all three classes of aggregate, and as indicated previously, mortars will generally contain no coarse aggregate. However, while acceptable concretes might be obtained containing only one or two of these three classes of aggregate, the preferred concretes will contain all three classes so as to obtain the closest packing and reduce the void filling volume of sulphur.

The content and form of coarse aggregate in the sulphur composition will determine if the composition is most suitably considered a concrete, mortar or coating. If, for example, the content of coarse aggregate is relatively low and the particle size is at the lower end close to the fine-aggregate range, then the sulphur composition may be more appropriately employed as, and considered as, a mortar, even though it contains coarse aggregate.

Similarly if the particle size of the fine aggregate is at the low end of the range it may be satisfactory to omit fines from the composition thereby reducing the cost since the fines are relatively expensive.

The mineral aggregate is composed of one or more of coarse aggregate, fine aggregate and fines. Suitably the mineral aggregate may comprise 0 to 100% of each of coarse aggregate, fine aggregate, fines and soil, to a total of 100%.

(a) Concretes

Sulphur concretes most suitably include a mixture of coarse aggregate, fine aggregate and fines as the mineral aggregate. Suitably the mineral aggregate may comprise 10 to 90%, preferably 15 to 80%, and more preferably 25 to 65%, by weight of coarse aggregate; 5 to 90%, preferably 5 to 85%, more preferably 30 to 85%, and most preferably 30 to 65%, by weight of fine aggregate; and 0 to 30%, preferably 0 to 20%, more preferably 5 to 15%, by weight of fines. The aggregate ingredients are selected within these ranges to a total of 100%, based on the total weight of mineral aggregate.

Suitably the sulphur concretes will contain in weight percent, 5 to 50%, preferably 5 to 30% and more preferably about 5 to 20% of the sulphur component; and 50 to 95%, preferably 70 to 95% and more preferably about 80 to 95% of mineral aggregate to a total of 100%.

Generally it is preferred to have a content of fines, particularly when coarse aggregate is present as in a sulphur concrete. The fines counteract the tendency for segregation of the sulphur from the larger aggregate particles, particularly the coarse aggregate. The fines also act to provide crystal nucleation sites and reduce the occurrence of cavities which develop with shrinkage of the sulphur composition which arises from the change in density of the sulphur on solidifying.

The fine aggregate and fines content affects the workability of the sulphur composition; and in particular improves the workability of the composition. However, too great a content of fine aggregate and/or fines will render the composition stiff so that it is more difficult to work.

(b) Sulphur Mortars

Sulphur mortars most suitably comprise 20 to 60%, more preferably 35 to 50%, by weight of the sulphur component, and 40 to 80%, more preferably 50 to 75%, by weight of the mineral aggregate, based on the weight of the mortar.

The mineral aggregate is suitably composed of fine aggregate and fines with no coarse aggregate. Generally, the mineral aggregate may comprise 0 to 100%, preferably 30 to 70%, by weight of fine aggregate and 0 to 100%, preferably 30 to 70%, by weight of fines, to a total of 100%, based on the total weight of mineral aggregate.

(v) Additives

The compositions of the invention may include additives to fulfill particular requirements.

Where plasticization of the sulphur is desired dicyclopentadiene or an olefinic hydrocarbon polymer of the aforementioned U.S. Pat. No. 4,058,500 may be employed.

Where improved flame resistance is desired, a fire retardant may be included.

In order to obtain improved ductility in the composition there may be utilized an additive in accordance with the afore-mentioned U.S. Pat. No. 4,188,230.

Additives such as bactericides may also be useful for particular applications.

Monocarboxylic acids of the naphthene series of hydrocarbons derived from petroleum (commonly called naphthenic acids) may also be used as modifiers for sulphur. (See Kirk, D. W., Othmer, D. F., Encyclopedia of Chemical Technology, Interscience Publ. 13, 727—734 (1965)).

(vi) Manufacture

The compositions of the invention are produced by mixing the ingredients together.

In one method preheated mineral aggregate and the sulphur component are mixed together alone or with desired additives as described previously, followed by the addition of the fibre elements and granulated sulphur. The resultant mixture is heated to a temperature above 115° C. preferably below 159° C., more preferably about 120° C. to about 140° C. to melt the sulphur, and the molten mixture is molded and allowed to cool and solidify.

In another method the mineral aggregate is first heated to a temperature close to that of the molten sulphur component, before mixing the aggregage with the molten sulphur component and fibre elements. Preheating of the aggregate in a current of air may be desirable to remove water which may be present in the aggregate.

The mixing of the heated aggregate and the molten sulphur component is suitably carried out at an elevated temperature effective to maintain the sulphur component in a molten state and below the temperature at which sulphur polymerizes to a high viscosity material.

Thus the mixing is generally carried out at a temperature of 115° C. to about 160° C. Above 159° C. sulphur begins to polymerize, while below 115° C. solidification occurs. Within this temperature range sulphur is a low viscosity liquid and can be readily mixed with mineral aggregate.

In one procedure the mineral aggregate is first preheated to a temperature in the molten sulphur range, i.e., 115° C. to 160° C., preferably below 159° C., more preferably about 120° C. to about 140° C. The preheated mineral aggregate is then mixed, in a suitable mixer, for example, a concrete mixer, with the molten sulphur and the fibre elements, until a substantially homogeneous mixture is obtained; the temperature being maintained throughout the mixing. The hot mix may be subsequently cast to a desired shape in the case of a sulphur concrete or may be used directly in the case of a concrete or mortar. Sulphur mortars can also be molded to form articles.

Although conventional aggregate handling techniques may be used it may be advantageous to add the fines after the addition of the molten sulphur to the remaining portion of the mineral aggregate, as this may avoid the formation of a dust composed of the fines.

Pre-heating of the mineral aggregate is desirable to avoid solidification of the molten sulphur component, by contact with mineral aggregate at a lower temperature, and to reduce the mixing time.

BRIEF DESCRIPTION OF THE DRAWINGS

The improved properties of the compositions of the invention are illustrated by reference to the accompanying drawings in which.

EXAMPLE 1

(a) Materials

The mix design for preparing sulphur concrete was supplied by the Sulphur Development Institute of Canada (SUDIC) and the University of Calgary. The aggregate consisted of coarse limestone (20% by weight) with a maximum particle size of 25.4 mm., fine limestone (55%) with sizes ranging from 1 mm. to 5 mm., and flyash (25%). The sulphur constituted 23% by weight of the above aggregate. A crude oil additive (2% by weight of sulphur) in accordance with the afore-mentioned U.S. Pat. No. 4,188,230 was heated with the sulphur.

Rovings of polyester (poly(ethylene terephthalate)) filaments (Hartford Fibres Ltd.) were precision cut to 25.4 mm., 38.1 mm. and 50.8 mm. lengths which gave aspect ratios (defined as the roving length divided by the equivalent roving diameter) of 80, 120 and 160. These different lengths were intended to show the effect of roving length on the flexural behaviour of sulphur concrete. The chopped rovings were coated with a thermoset acrylic binder to prevent segregation of the individual filaments from the rovings during mixing.

Rovings of alkali-resistant glass filaments (AR glass rovings, Fiberglas Canada) were coated with a polyester binder and were chopped to a 50 mm. length (aspect ratio of 290) with a portable cutter. The physical properties of the two fibre element types are summarized in Table 1 below.

TABLE 1

Properties of Rovings of Polyester Roving Filaments and Rovings of Alkali Resistant Glass Filaments

| Property | Polyester Rovings | AR-Glass Rovings |
|---|---|---|
| No. of filaments per strand | 167 | 204 |
| Filament diameter, $\mu m$ | 30 | 12 |
| Equivalent roving diameter, $\mu m$ | 328 | 171 |
| Tensile strenght, MPa | 931 | 2500 |
| Tensile modulus, GPa | 5.9 | 70 |
| Breaking elongation, % | 17 | 4 |
| Specific gravity | 1.38 | 2.69 |

The sulphur content of the sulphur concretes was increased with respect to the control in order to compensate for the addition of the fibre elements and to reduce void formation. The batch designs are summarized in Table 2 below.

TABLE 2

Batch Designs of Fibre Element-Containing Sulphur Concretes

| | Coarse limestone | 1100 g | |
| | Fine limestone | 3025 g | |
| | Flyash | 1375 g | |

| Fibre Concentration*, % | Fibre, g | Sulphur, g | Plasticizer, g |
|---|---|---|---|
| 0 | 0 | 1265 | 25.3 |
| 1 | 13.2 | 1320 | 26.4 |
| 2 | 27.5 | 1375 | 27.5 |
| 3 | 42.9 | 1430 | 28.6 |
| 4 | 59.4 | 1485 | 29.7 |
| 5 | 77.0 | 1540 | 30.8 |
| 7 | 115.5 | 1650 | 33.0 |
| 9 | 158.4 | 1760 | 35.2 |

*Percentages shown are given as a weight percentage of the sulphur content in each sample.

(b) Procedure

For convenience, a dry mix method was used to prepare the test specimens. Preheated graded aggregate and plasticizer were mixed together, followed by the addition of the fibre elements and granulated sulphur. The mixture was placed in a 191 mm×330 mm×51 mm deep aluminum tray for the flexural test specimens, whereas 102 mm×204 mm metal cylindrical molds were used for the compression test specimens.

The mixtures with containers were placed in an oven for four hours at 125° C.

After removal from the oven, the heated container with its contents was vibrated for one minute to consolidate the mixture and to help eliminate any trapped gases in the molten slurry. The mixture was then allowed to cool and to solidify.

The resulting slab was demolded and cut into four 330 mm×45 mm×45 mm test beams using a radial diamond saw. The cylindrical samples were capped on each end to provide smooth surfaces for compression testing.

Specimens were stored in air for 7 days prior to testing at room temperature. Some specimens were immersed in water for 25 days in order to access the effect of moisture on the mechanical properties. Flexural testing was performed on a test jig with two loads located at the third points of a 300 mm span. The mid-span deflection was measured by a transducer and the load-deflection response was plotted on an x-y recorder. Compression testing was performed on an MTS machine and the stress-strain curve was obtained directly on an x-y plotter.

(c) Results

Figure 1:
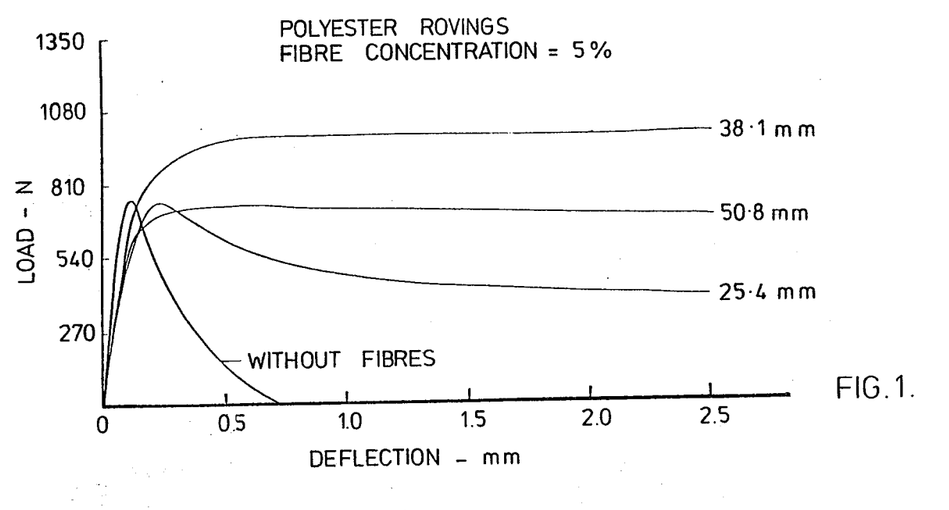
FIG. 1 is a graph showing load deflection curves obtained by flexural testing of sulphur concretes of the invention containing polyester fibre elements of various lengths, in a concentration of 5% by weight of the sulphur.

Typical load-deflection characteristics obtained by flexural testing of specimens containing 5 percent of the polyester elements (as a weight percentage of sulphur content) having 25.4 mm, 38.1 mm and 50.8 mm lengths are set out in FIG. 1.

In the absence of the fibre elements the response curve of sulphur concrete is characterized by a sudden loss of strength after the formation of a crack at the maximum stress.

The presence of the fibre elements transforms the brittle sulphur concrete into a progressive fracture behaviour having a plateau region at the ultimate load. Cracking of the fibre element-containing concrete begins at about the same stress as the sulphur concrete containing no fibre elements.

Superior performance with regard to ultimate load capacity was achieved by using 38.1 mm long polyester rovings.

Figure 2:
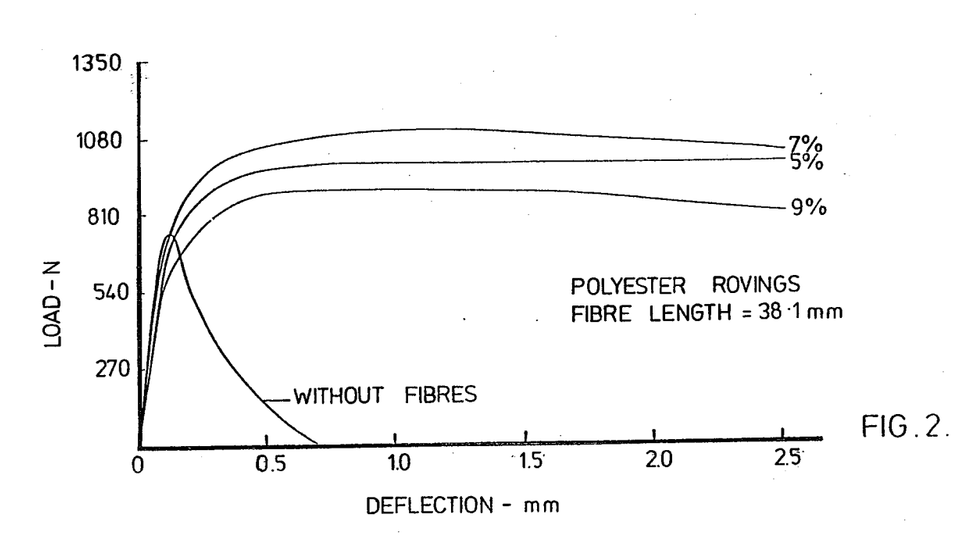
FIG. 2 is a graph showing load deflection curves obtained by flexural testing for sulphur concretes containing polyester fibre elements at different concentrations.

After the optimum length of 38.1 mm had been established for this series of experiments, the fibre element concentration was increased to 7% and 9%, and the corresponding load-deflection curves for these specimens are set out in FIG. 2. The gradual failure mode of those specimens was also evident and there was an increase in ultimate load capacity when the fibre element concentration increased from 5% to 7%.

Figure 3:
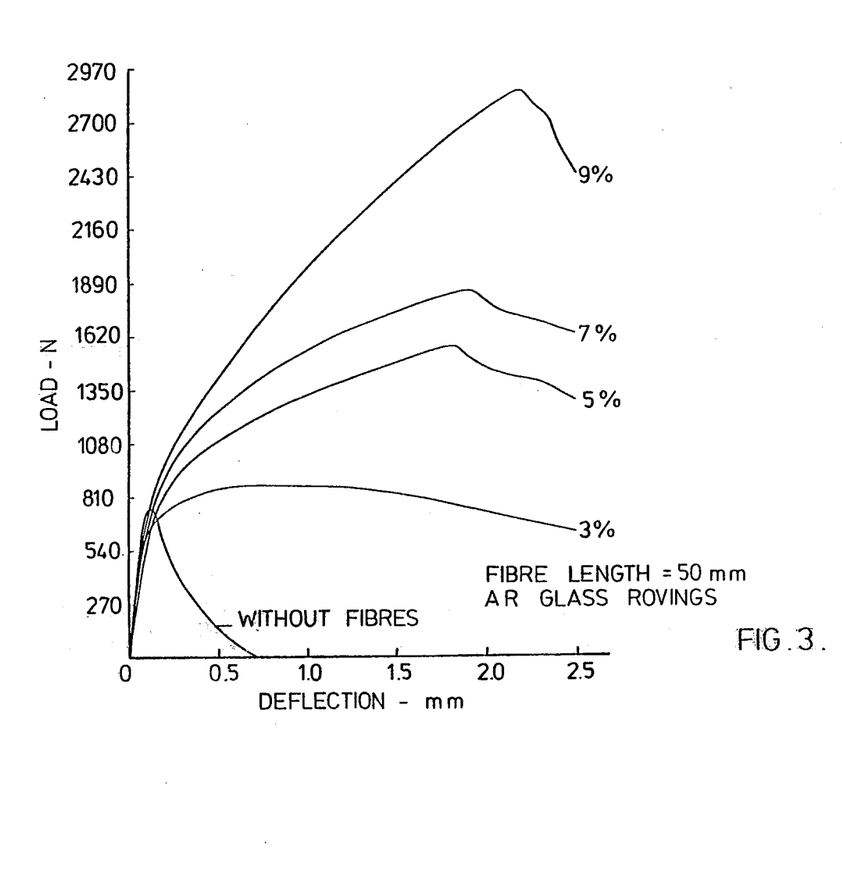
FIG. 3 is a graph showing load deflection curves obtained by flexural testing of sulphur concretes containing glass fibre elements at different concentrations.
Figure 4:
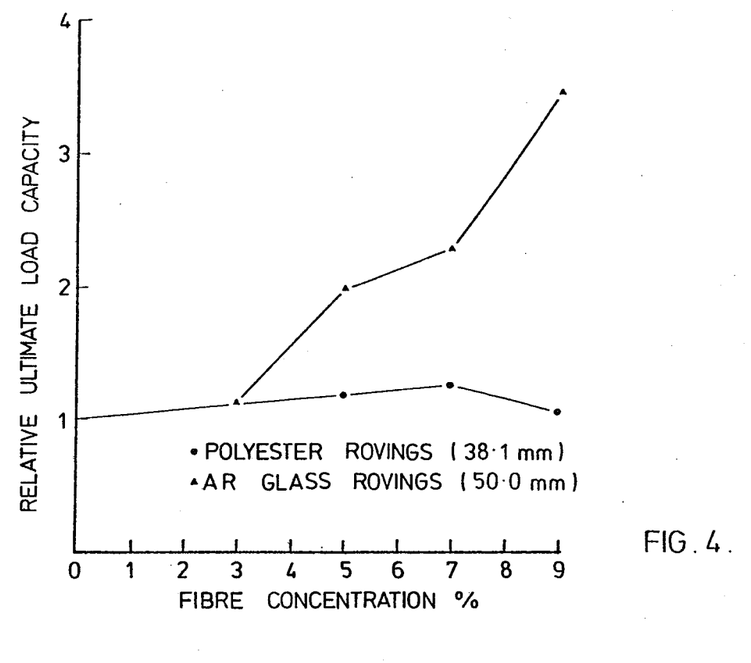
FIG. 4 is a graph comparing ultimate flexural load for glass fibre and polyester fibre elements.
Figure 5:
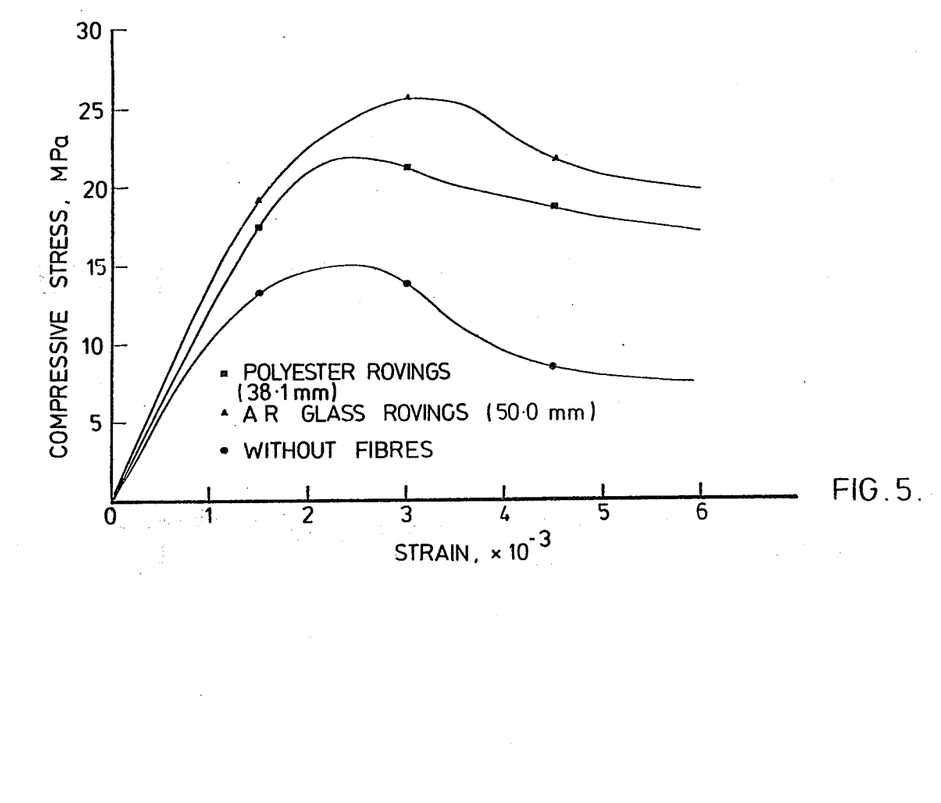
FIG. 5 is a graph comparing compressive stress and strain curves of fibre reinforced sulphur concrete with and without fibre elements.

The load-deflection curves of sulphur concrete beams reinforced with AR glass rovings (50 mm) are compared in FIG. 3. The ultimate load increased with increasing fibre element concentration. The initial portion of each curve is linear up to the proportional elastic limit (PEL) where the first crack occurs. The strength at PEL is often referred to as the first crack strength and the region beyond that point is described as post cracking behaviour. Beyond the PEL, the curves are nonlinear reflecting a gradual loss of stiffness as the concrete develops further cracks until the ultimate load is reached. When the fibre element concentration is small (3%) the load-deflection curve shows a plateau region similar to that of sulphur concrete containing polyester fibre elements.

Table 3 below summarizes the flexural test results of both fibre element types. The strength ratio of polyester fibre element-containing sulphur concrete increased to a maximum of 1.26 at a fibre concentration of 7% whereas the strength ratio of sulphur concrete containing AR glass fibre elements increased to 3.5 when the glass fibre concentration was 9%.

The compressive strengths of sulphur concrete containing 5% fibre elements are summarized in Table 4. The compressive strength of sulphur concrete containing polyester fibre elements (38.1 mm) was improved by 33% over the sulphur concrete control whereas the compressive strength was increased by 50% for glass fibre element-containing sulphur concrete.

TABLE 3

Flexural Properties of Polyester and AR Glass Fibre Element-Containing Sulphur Concretes

| Sample (a) | Fibre Element Length mm | Fibre Element Concentration (b) % | Mean Ultimate Load (c) (d) N | Ultimate Load Ratio (e) |
| --- | --- | --- | --- | --- |
| control | 0 | 0 | 734 ± 63 | 1.00 |
| PR-A5 | 25.4 | 5% | 776 ± 80 | 1.06 |
| PR-B5 | 38.1 | 5% | 856 ± 62 | 1.17 |
| PR-C5 | 50.8 | 5% | 653 ± 14 | 0.89 |
| PR-B7 | 38.1 | 7% | 925 ± 62 | 1.26 |
| PR-B9 | 38.1 | 9% | 775 ± 75 | 1.06 |
| AR-A3 | 50.0 | 3% | 835 ± 83 | 1.14 |
| AR-A5 | 50.0 | 5% | 1470 ± 164 | 2.00 |
| AR-A7 | 50.0 | 7% | 1670 ± 127 | 2.28 |
| AR-A9 | 50.0 | 9% | 2550 ± 275 | 3.47 |

(a) PR—Polyester roving fibre elements
AR—Alkali resistant glass roving fibre elements
(b) As a weight percentage of the added sulphur
(c) Measured by four-point flexural testing of 330 mm × 45 mm × 45 mm beams on a 300 mm span
(d) Average of four values
(e) Ratio of mean ultimate load of sulphur concrete containing fibre elements to that of control without fibres.

TABLE 4

Compressive strengths of Sulphur Concretes Reinforced with 5% Fibre Elements

| Sample (a) | Mean Compressive Strength (b) (c) MPa | Compressive Strength Ratio (d) |
| --- | --- | --- |
| control | 15.00 ± 0.35 | 1.00 |
| PR | 20.00 ± 2.60 | 1.33 |
| AR | 22.50 ± 2.70 | 1.50 |

(a) control—without fibre elements
PR—polyester rovings (38.1 mm)
AR—alkali resistant glass rovings (50.0 mm)
(b) Measured on 102 mm × 204 mm test cylinders
(c) Average of three values
(d) Ratio of mean compressive strength of sulphur concrete with fibres to that of control without fibres.

A few samples were immersed in tap water for a period of 25 days in order to evaluate the influence of moisture on the mechanical properties. The sulphur concrete samples containing 7% glass fibre elements (50 mm) showed no change in the maximum load or the load-deflection response. However, the specimens containing 7% polyester fibre elements (38.1 mm) experienced an apparent 14% decrease in the maximum load. It is believed that the type of binder which is used to coat the roving filaments influences the water sensitivity.

The total fracture energy as indicated by the area under the load-deflection curve increased substantially when even a small concentration of fibre elements was present. The load required to initiate the first crack was nearly the same for all samples although it was not apparent from the flexure load-deflection curves when the first crack appeared. The additional energy is derived from fibre debonding and pullout mechanisms following crack initiation. It is apparent from FIGS. 1, 2 and 3 that this energy is many times greater than the fracture energy of unmodified sulphur concrete.

I claim:

1. A composition comprising a mixture of a particulate mineral aggregate, a sulphur component in an amount effective to bind the aggregate, said sulphur component being selected from the group consisting of elemental sulphur, modified sulphur and mixtures thereof, and fibre elements having a length of at least 3 cm. dispersed throughout said mixture, said fibre elements being present in an amount effective to promote fracture toughness in said mixture and retard crack propagation, said fiber elements comprising bundles of filaments, said bundles being coated with a binder coating effective to maintain bundle integrity.

2. A composition according to claim 1, wherein said fibre element have a length of 3 to 5 cm. and are present in an amount of 1 to 10%, by weight, of the sulphur component.

3. A composition according to claim 2, wherein said fiber elements comprises bundles of polyester filaments in an amount of 5 to 7%, by weight, of said sulphur component.

4. A composition according to claim 2, wherein said fiber elements comprise bundles of glass filaments in an amount of 3 to 5%, by weight of said sulphur component.

5. A composition according to claim 2, wherein said bundles comprise bundles of inorganic or organic filaments in the form of chopped rovings.

6. A composition according to claim 2, wherein said fibre elements have a modulus of about 5 to about 75 GPa, a breaking elongation of 3 to 20%, a tensile strength of 750 to 3000 MPa, and have a generally cylindrical form with a diameter of about 150 to 350 μm.

7. A concrete composition according to claim 2, comprising 5 to 20%, by weight of sulphur; said aggregate comprising to a total of 100% in weight percent, 15 to 80% of coarse aggregate; 5 to 85% of fine aggregate and 5 to 15% of fines.

8. A concrete article comprising a particulate mineral aggregate, the particles of aggregate being bonded together in a matrix of a sulphur component, and fiber elements having a length of at least 3 cm. and being dispersed throughout said matrix, said fiber elements being present in an amount of 3 to 10%, by weight of said sulphur component, said sulphur component being selected from the group consisting of elemental sulphur, modified sulphur and mixtures thereof, and said fiber elements comprising bundles of filaments, said bundles being coated with a binder coating effective to maintain bundle integrity.

9. A concrete article according to claim 8, wherein said fibre elements have a length of 3 to 5 cm., a modulus of about 5 to about 75 GPa, a breaking elongation of 3 to 20% and a tensile strength of 750 to 3000 MPa.

10. A concrete article according to claim 9, wherein said fibre elements have a generally cylindrical form with a diameter of about 150 to 350 μm.

11. A composition according to claim 1, wherein said fibre elements are present in an amount of 1 to 20% by volume of the sulphur component.

12. A concrete article according to claim 8, wherein said filaments are polyester filaments, and said fiber elements are present in an amount of 5 to 7%, by weight, of said sulphur component.

13. A concrete article according to claim 8, wherein said filaments are glass filaments, and said fiber elements are present in an amount of 3 to 5%, by weight, of said sulphur component.

14. A composition comprising a mixture of a particulate mineral aggregate, a sulphur component in an amount of 5 to 60%, by weight of the composition, effective to bind the aggregate, said sulphur component being selected from the group consisting of elemental sulphur, modified sulphur and mixtures thereof, and fiber elements dispersed throughout said mixture, said fiber elements having a generally cylindrical form with a diameter of about 150 to 350 μm, a length of at least 3 cm., a modulus of about 5 to about 75 GPa, a breaking elongation of 3 to 20%, and a tensile strength of 750 to 3000 MPa, said fiber elements being present in an amount effective to promote fracture toughness in said mixture and retard crack propagation.

15. A composition according to claim 14, wherein said fiber elements are present in an amount of 1 to 10%, by weight of the sulphur component.

* * * * *